March 11, 1958  J. K. BOUGHTON ET AL  2,826,364
APPARATUS FOR ACTUATING A PRODUCTION COUNTER
Filed April 1, 1954  3 Sheets-Sheet 1

INVENTOR.
JAMES K. BOUGHTON
BY  WILBUR L. JONES

R. L. Miller
ATTORNEY

March 11, 1958 J. K. BOUGHTON ET AL 2,826,364
APPARATUS FOR ACTUATING A PRODUCTION COUNTER
Filed April 1, 1954 3 Sheets-Sheet 2

INVENTOR.
JAMES K. BOUGHTON
BY WILBUR L. JONES
ATTORNEY

March 11, 1958  J. K. BOUGHTON ET AL  2,826,364
APPARATUS FOR ACTUATING A PRODUCTION COUNTER
Filed April 1, 1954  3 Sheets-Sheet 3

INVENTOR.
JAMES K. BOUGHTON
WILBUR L. JONES
BY
ATTORNEY

United States Patent Office 2,826,364
Patented Mar. 11, 1958

2,826,364

APPARATUS FOR ACTUATING A PRODUCTION COUNTER

James K. Boughton, Lucasville, and Wilbur L. Jones, Kent, Ohio, assignors to The Goodyear Tire & Rubber Company, Akron, Ohio, a corporation of Ohio Application April 1, 1954, Serial No. 420,422

3 Claims. (Cl. 235—92)

This invention relates to apparatus for attachment to a machine for making articles which actuates a production counter in a manner that the count will register only the actual number of articles manufactured on the machine.

Since machine operators are frequently paid a fixed amount for each article which they produce, it is important to accurately count the total number of articles actually produced. Various mechanical and electrical production counter actuating means are known. However, these actuators frequently permit unscrupulous machine operators to turn the counter by hand or otherwise trip the counter actuating means.

Production machines for manufacturing sundry articles perform a cycle or plurality of operations in a predetermined sequence. The counter actuating means of this invention may be readily attached to such machines and receive electrical impulses from the machine corresponding to the performance of pre-selected operations on the machine. However, the counter cannot be actuated until all of the pre-selected operations of the cycle are preformed in a proper sequence.

An object of this invention is to provide a counter actuating means which cannot be manipulated to falsify the number of articles produced on a production machine and is tamper-proof in operation.

A further object of this invention is to provide a means for actuating a counter which will count the number of articles actually manufactured on a production machine, and at the same time allow for replacing defective or partially manufactured articles without affecting a count.

Another object of this invention is to provide a means for actuating a counter for automatically determining the number of articles actually produced on a production machine for a given period of time and which is particularly characterized by its simplicity in construction, economy of operation and ease of installation.

Other objects and advantages of the invention relating to the particular arrangement and construction of the various parts will become apparent as the description proceeds.

Fig. 1 of the drawings is a side elevation with parts broken away showing the counter and counter actuating assembly of the present invention.

Figure 1:
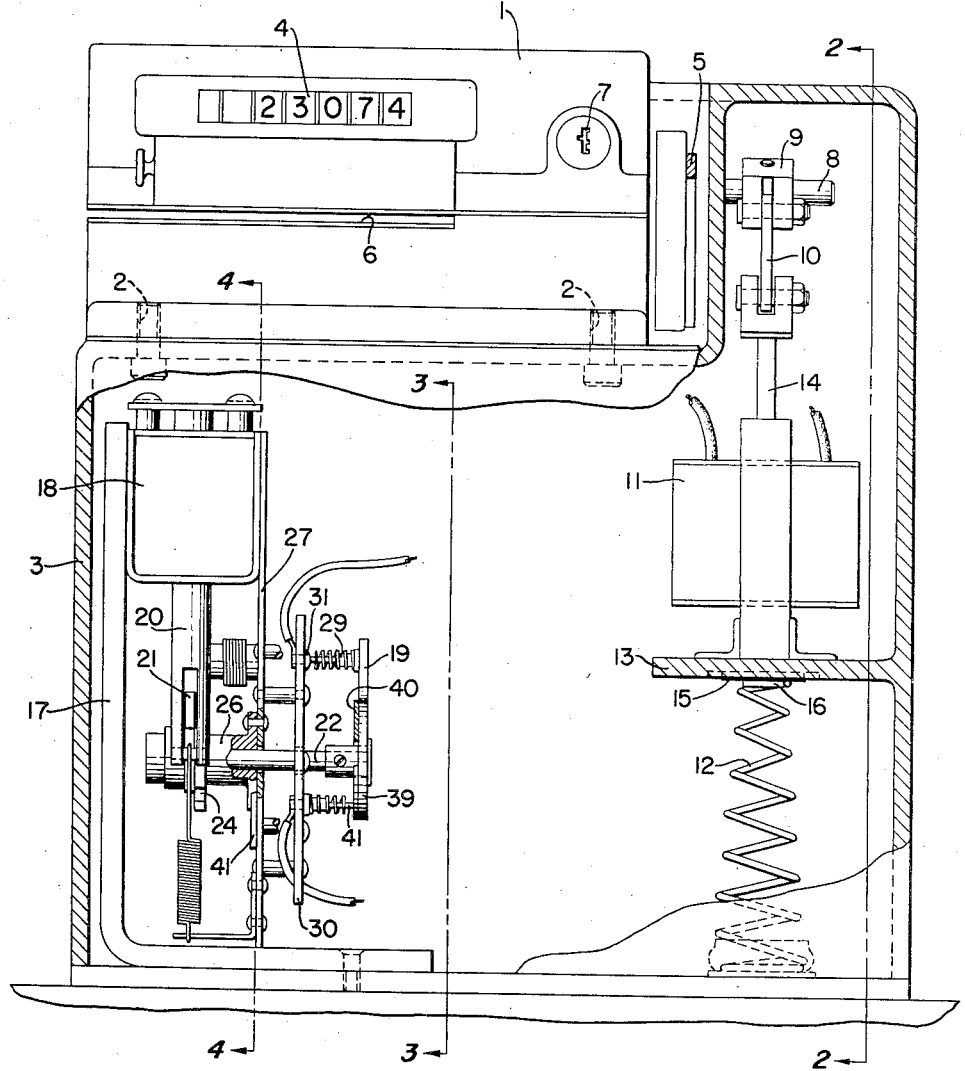

Referring to Fig. 1 of the drawings, a commercial counter 1 is secured by means of screws 2 to the housing 3 which encloses the counter actuating apparatus of the present invention. The counter 1 is provided with a visual meter 4 and a printing actuating lever 5. A card may be inserted into the slot 6 whenever a printed record of the reading upon the meter 4 is desired to be made. Actuation of the lever 5 will cause the visual count to be recorded on the inserted card. The counter is also provided with means to reset the counter to zero by inserting a key into the lock 7. It is to be understood that the term counter as used herein refers to any recording mechanism which will record graphically, numerically or in code the number of mechanical or electrical signals received thereby. Although this invention will be described and illustrated in conjunction with a mechanically actuated counter, it will be apparent as the description proceeds that the invention is equally applicable to either mechanically or electrically actuated recording mechanisms.

In the embodiment of the invention shown, the counter 1 is actuated by oscillation of the shaft 8 through a lever 9 and a link 10 which is reciprocated by energization of the solenoid 11 and returned to normal position by the spring 12. The counter actuating solenoid 11 is supported upon a plate 13 and the core 14 thereof is provided with an axially extending portion 15 having a flange 16 which bears against the compression spring 12 which urges the core 14 into normal position.

Figure 4:
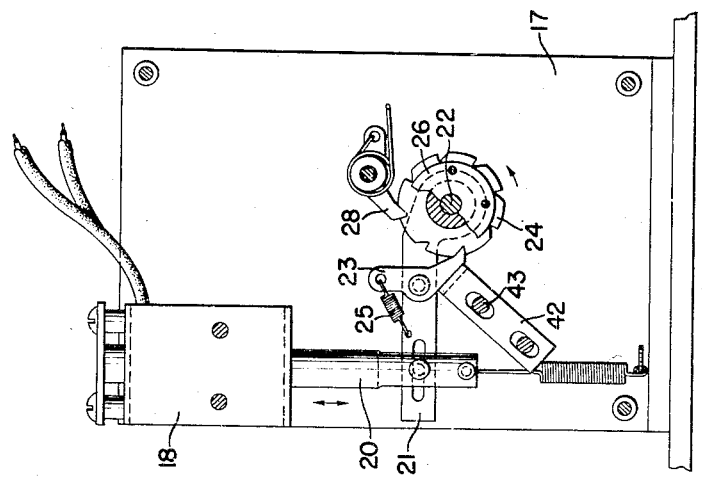
Fig. 4 is a cross-sectional view taken along the lines 4—4 of Fig. 1.
Figure 3:
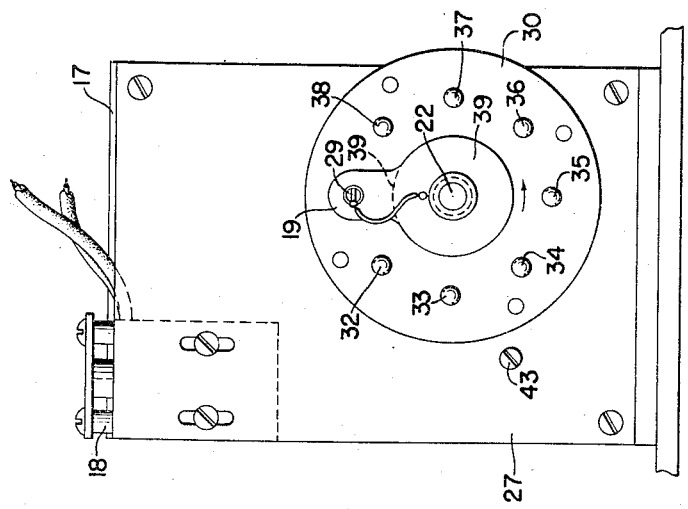
Fig. 3 is a cross-sectional view taken along the lines 3—3 of Fig. 1.

A plate 17 secured to the base of the housing 3 supports a solenoid 18 which actuates the switch arm 19 of a multiple contact switch through a pawl and ratchet mechanism, more fully described hereinafter. The solenoid core extension 20 is pivotably connected to an arm 21 rotatable with respect to the shaft 22. Energization of the solenoid 18 will cause the extension 20 to be moved from its normal position as shown in Fig. 4 in an upward direction. The extension 20 is returned to normal position by a coil spring attached between the outer extremity of the extension 20 and the plate 17. A pawl 23 is pivotably connected to the arm 21 and is urged into engagement with the ratchet wheel 24 by spring 25. The ratchet wheel 24 is keyed to the shaft 22 which is rotatably mounted in the bearing 26 supported by the plate 27. Ratchet wheel 24 is prevented from moving clockwise by a check pawl 28 which is adapted to slide over the teeth of the ratchet wheel 24 during clockwise movement thereof. It is seen that energization of the solenoid 18 causes the arm to rotate counterclockwise carrying the pawl 23 to the next tooth of the ratchet wheel 24 and as the solenoid 18 returns to normal position an increment of rotation will be imparted to the ratchet wheel 24 and shaft 21.

The switch arm 19 is secured to the rotatable shaft 22 and is provided with a depending contact finger 29 adapted to engage a contact or terminal 31 of the contact plate 30 rigidly secured to the bearing 26. The distance between each terminal 31 through 38 is equal to the circumferential distance between the teeth of the ratchet wheel 24 so that actuation of the pawl 23 moves the switch arm 19 and its depending contact finger 29 from one terminal of the contact plate to the next terminal. The switch arm 19 is also provided with a base flange 39 having a disk element 40 of current-conducting material which is engaged by a contact finger 41 fixed to the contact plate 30. An electrical circuit is thereby established between the fixed finger 41, the disk element 40, switch arm 19, depending contact finger 29 and any particular terminal engaged by the finger 29.

In order to obtain relatively fine adjustment for limiting the stroke of the pawl 23 so as to preclude over-running of the ratchet wheel 24, there is provided a suitable stop 42 adjustably secured to plate 17 by means of screws 43.

Figure 5:
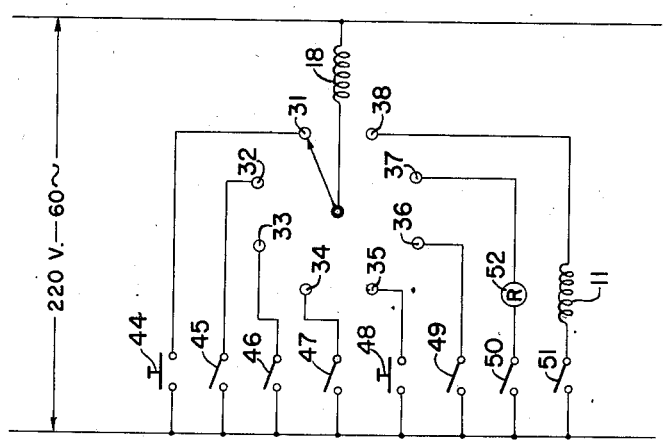
Fig. 5 shows diagrammatically the control circuit for the counter actuating apparatus.
Figure 2:
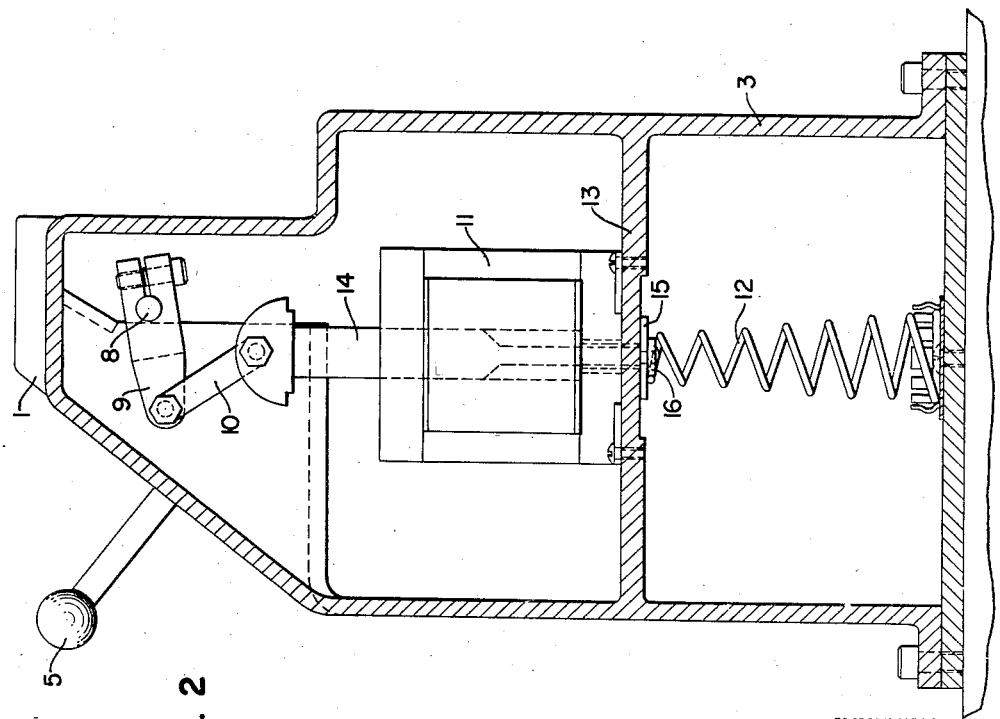
Fig. 2 is a cross-sectional view taken along the lines 2—2 of Fig. 1.

Referring to Fig. 5 of the draw, each of the terminals 31 through 38 is electrically connected to a limit, solenoid, or push button switch 44 through 51 which are respectively energized by the performance of an operation on the article production machine. Whenever the particular operation is performed one of the switches 44 through 51 is closed so that an impulse of electrical current passes through the associated terminals. The switch arm 19 is shown in contacting position with the terminal 31 and is connected electrically in series with the switch solenoid 18. The counter actuating solenoid 11 is connected in series with the last terminal 38.

Assuming that the operator of the production machine is beginning a cycle of operations necessary to produce an article in which eight operations are critical, the switch arm 19 will initially be in contact with the first terminal 31 of the series as shown in Fig. 5. When the push button switch 44 is actuated to perform the first critical step, an electrical impulse will flow through the terminal 31, switch arm 19 and solenoid 18. Energization of the solenoid 18 moves the pawl 23 so that upon deenergization of solenoid 18 the pawl moves ratchet wheel 24 to rotate the switch arm 19 from the first terminal 31 of the series to the next succeeding terminal 32. The solenoid will remain deenergized until the operator performs the next critical operation which is controlled by the switch 45 at which time an electrical impulse again energizes the solenoid 18 through the terminal 32 and switch arm 19 so as to move the switch arm to the next succeeding terminal 33. It is obvious that, as the production machine is operated, the performance of certain pre-selected steps initiated by closing of the switches 44 through 51 will cause the switch arm 19 to be moved from one terminal to the next succeeding terminal contact until the last terminal 38 in the series has been contacted. The last impulse in the series initiated by the actuation of the switch 51 energizes the counter actuating solenoid 11 and causes the counter or recording mechanism to record a single count. Simultaneously, the solenoid 18 is actuated so as to rotate the contact arm 19 to engage the first contact 31. The counter actuating mechanism is then in position to begin a new count.

In some article production machines it may not be possible or convenient to connect all of terminals 31 through 38 to switches on the production machines which are momentarily energized. In that event, a time delay relay 52 having normally closed contacts may be connected in series with the particular switch and its associated terminal. The relay 52 may be adjusted to open after a delay of about one second so that the solenoid 18 is deenergized after the core extension 20 has been moved the complete extent of its travel.

From the foregoing description, it is apparent that the present invention provides an economical counter actuating unit which can easily be secured to a production machine so that the mechanism thereof is inaccessible to the machine operator. It is seen that the mechanism cannot actuate the counter 1 unless all of the switches 44 through 51 are actuated in their proper sequence. Thus, if the operator should attempt to fraudulently trip the counter by omitting a step controlled by the switch 47 while performing the step controlled by the switch 48 the solenoid 11 will remain deenergized and no count will be registered even though all of the succeeding steps are performed. It is also seen that the counter will likewise not be advanced if an article on the production machine is removed before it is completed.

It is to be understood that the present invention is in no way limited to the specific number of production machine switches 44 through 51 or terminals 31 through 38 illustrated in the description and drawings. Obviously, a greater or lesser number of terminals and corresponding switches may be used, depending upon the type of article production machine. It is not usually economically feasible, nor is it necessary, to use a number of switches 44 through 51 equal to the number of machine operations necessary to produce the article, since the operator cannot readily learn the critical steps which cause the switches 44 through 51 to be actuated nor the sequence of actuation necessary to actuate the counter.

While certain representative embodiments and details have been shown for the purpose of illustrating the invention, it will be apparent to those skilled in this art that various changes and modifications may be made therein without departing from the spirit or scope of the invention.

I claim:

1. An apparatus for counting articles manufactured by a plurality of operations on an article production machine comprising, a counter, an article-producing machine, means to advance said counter, a plurality of switch means on said production machine energized respectively by the initiation of one of a pre-determined number of operations in the production cycle of said machine, a multiple contact switch having an open contact electrically connected with each respective switch means, said multiple contact switch having an electrically-powered switch arm for sequentially closing said contacts only in response to sequential energization of said switch means and a second electrically-powered means for actuating said counter-advancing means, said second electrically-powered means energized by the closing of the last contact in the series.

2. An apparatus for counting articles manufactured by a plurality of operations on an article-production machine comprising, a counter, an article-production machine, driven means to advance said counter, a plurality of switch means on said production machine energized respectively by the initiation of one of a pre-determined number of operations in the production cycle of said machine, a multiple contact switching having an open contact electrically connected with each respective switch means, an electrically-actuated switch arm for sequentially closing said contacts only in response to sequential energization of said switch means, and means for driving said counter advancing means energized by closing the last contact in the sequence.

3. An apparatus for counting articles manufactured by a plurality of operations on an article production machine comprising in combination a counter, an article production machine, means to advance said counter, a plurality of switches on said production machine which are closed respectively by the initiation of one of a pre-determined number of operations in the production cycle of said machine, a multiple contact switch having electrically powered means for moving the switch arm thereof from one contact to the next succeeding contact, each contact of said multiple contact switch being respectively electrically connected to a switch means on said production machine, said contacts being positioned relative to said switch arm so that said contacts are closed in a sequence corresponding to the sequence of operations in the production cycle of said production machine, said electrically powered means being energized through said switch arm and a solenoid coil for actuating said counter advancing means which is energized by the closing of the last contact in said multiple contact switch.

References Cited in the file of this patent

UNITED STATES PATENTS

| | | |
|---|---|---|
| 1,881,580 | Hodge | Oct. 11, 1932 |
| 2,131,706 | Joyce et al. | Sept. 27, 1938 |
| 2,277,146 | Roby | Mar. 24, 1942 |
| 2,318,372 | Caldwell | May 4, 1943 |
| 2,631,853 | Haynes et al. | Mar. 17, 1953 |